United States Patent [19]
Kelsic et al.

[11] Patent Number: 5,943,184
[45] Date of Patent: Aug. 24, 1999

[54] DISK DRIVE WITH A FLAT ANNULAR SPRING CLAMP AND COMPONENTS DIMENSIONED TO MAINTAIN DISK FLATNESS

[75] Inventors: Gary F. Kelsic; Robert A. Alt, both of Longmont, Colo.

[73] Assignee: Mobile Storage Technology, Inc., Boulder, Colo.

[21] Appl. No.: 08/683,027

[22] Filed: Jul. 15, 1996

Related U.S. Application Data

[63] Continuation of application No. 08/375,764, Jan. 20, 1995, abandoned, which is a continuation-in-part of application No. 08/190,828, Feb. 2, 1994, abandoned.

[51] Int. Cl.⁶ .................................................. G11B 17/08
[52] U.S. Cl. ......................................................... 360/98.08
[58] Field of Search ........................... 360/99.12, 98.08, 360/98.01, 99.05, 99.08, 271; 369/270

[56] References Cited

U.S. PATENT DOCUMENTS

| | | | |
|---|---|---|---|
| 4,864,443 | 9/1989 | Peterson | 360/99.12 |
| 4,918,545 | 4/1990 | Scheffel | 360/98.08 |
| 5,089,922 | 2/1992 | LeClair | 360/99.08 |
| 5,101,306 | 3/1992 | Johnson | 360/99.12 |
| 5,333,080 | 7/1994 | Ridinger et al. | 360/99.12 |
| 5,367,418 | 11/1994 | Chessman et al. | 360/99.12 |
| 5,452,157 | 9/1995 | Chow et al. | 360/99.12 |
| 5,490,022 | 2/1996 | Hoshina | 360/98.08 |
| 5,550,687 | 8/1996 | Suzuki | 360/99.12 |

FOREIGN PATENT DOCUMENTS

| | | |
|---|---|---|
| 63-103485 | 5/1988 | Japan . |
| 02210681 | 8/1990 | Japan . |
| 03183057 | 8/1991 | Japan . |
| 4-74373 | 3/1992 | Japan . |
| 4-184758 | 7/1992 | Japan . |

*Primary Examiner*—A. J. Heinz
*Attorney, Agent, or Firm*—Skjerven, Morrill, MacPherson Franklin and Friel; David W. Heid; Fabio E. Marino

[57] ABSTRACT

A disk drive with a drive motor having a spindle rotatable around an axis of rotation, one or more disks mounted on the spindle separated by annular spacers which have a radial dimension selected to maintain flatness of the disks, an annular ring dimensioned to distribute force evenly to the disks engaging the last mounted disk, a flat annular spring clamp for applying force uniformly to the annular ring, and a retaining member to hold the annular spring clamp in place.

36 Claims, 11 Drawing Sheets

FIG. 8A  FIG. 8B
KEY TO FIG. 8

DISK DRIVE WITH A FLAT ANNULAR SPRING CLAMP AND COMPONENTS DIMENSIONED TO MAINTAIN DISK FLATNESS

CROSS REFERENCE TO RELATED APPLICATION

This application is a continuation of application Ser. No. 08/375,764, filed Jan. 20, 1995, now abandoned, which is a continuation-in-part of application Ser. No. 08/190,828, entitled "Axial Clamp For Disk Drive," filed Feb. 2, 1994, now abandoned.

FIELD OF THE INVENTION

This invention relates to disk drives, and more particularly, to apparatus for mounting a disk or disks thereof to the spindle of a drive motor.

BACKGROUND OF THE INVENTION

Figure 1:
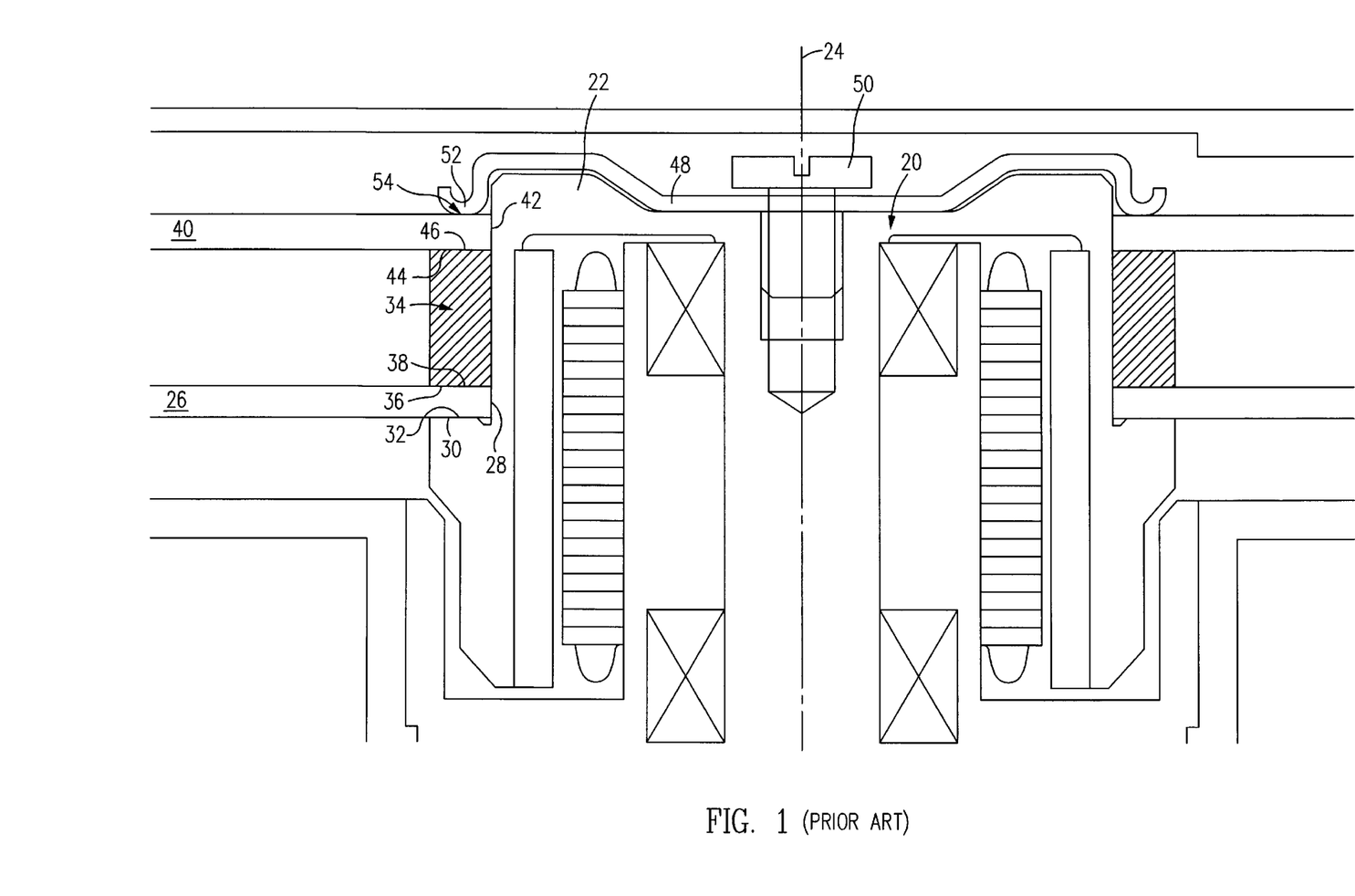
FIG. 1 is a sectional view showing a typical prior art apparatus for mounting disks to the spindle of a disk drive motor.

A typical prior art structure for mounting disks of a disk drive to the spindle of a drive motor is shown in FIG. 1. As shown therein, a disk drive motor 20 includes a spindle 22 which is rotatable about an axis of rotation 24. A first disk 26 includes a central aperture 28 through which the spindle 22 is disposed, one side 30 of the disk 26 at its inner periphery being in contact with an annular spindle surface 32 which is perpendicular to the rotational axis 24 of the spindle 22. An annular spacer 34 is fitted about the spindle 22, and has a surface 36 perpendicular to the axis of rotation 24 and in engagement with the inner periphery of the disk 26 on the opposite side 38 of the disk 26. Another disk 40 has a central aperture 42 through which the spindle 22 is disposed, the disk 40 at its inner periphery having one side 44 in engagement with surface 46 of the annular spacer 34, which surface 46 is perpendicular to the axis of rotation 24 of the spindle 22. A single-piece stamped or formed disk spring clamp 48 is fixed to the spindle 22 by means of screw 50 and has an annular portion of U-shaped cross section adjacent its outer edge 52 for engagement with the inner periphery of the disk 40 on the opposite side 54, to force the disk 40 in a direction downward as shown in FIG. 1.

It will be understood that one of the key parameters for optimum performance of disk drives is the flatness of the installed disks. In general, the best flatness is achieved when the disk is mated against very smooth, flat surfaces on both sides of the disk.

Because of the configuration of the conventional disk spring clamp 48, when clamping force is applied to the surface 54 at the inner periphery of the disk 40, a small radial force is applied to the disk 40 (away from the axis of rotation 24) in addition to the forces parallel to the rotational axis 24.

Several problems exist with the conventional disk spring clamp 48 of FIG. 1. For example, surface finish and flatness is very difficult to achieve and maintain at the region where the disk spring clamp 48 contacts the disk 40. The forming or bending process of the disk spring clamp 48 often creates microcracks in the clamp 48 at the portion of U-shaped cross section that touches the disk 40. Furthermore, the clamping force applied to the disk 40 is not uniform. This is due to the anisotropic nature of rolled sheet stock used to form the clamp 48, the forming process itself, and the screw head torque warping the clamp 48 during installation. All of these forces are transmitted through to the disk 40.

Furthermore, installation and application of the clamp 48 creates contamination and residual stresses. As the axial force is applied via the screw, the point at which the clamp contacts the disk translates and rotates due to the deflection being induced in the clamp 48. This relative motion galls the soft aluminum disk surface resulting in particulate formation. The resultant and residual radial force contributes to an out-of-flat disk.

SUMMARY OF THE INVENTION

The present invention overcomes the above-cited problems by providing a mounting structure for a disk (or disks) on a spindle of a disk drive motor. In a double disk structure, first and second disks are mounted to a spindle, with an annular spacer therebetween. An annular member is positioned on the second disk for contact with the second disk, and a spring member is fastened to the spindle so that the annular member is forced against the second disk to in turn force the second disk against the spacer, in turn forcing the first disk against the surface portion of the spindle.

The engaging surfaces of the annular member, annular spacer and spindle are each perpendicular to the axis of rotation of the spindle, with each engaging surface of the annular spacer being flatter and wider than its associated engaging surface.

DESCRIPTION OF THE PREFERRED EMBODIMENTS

Figure 2:
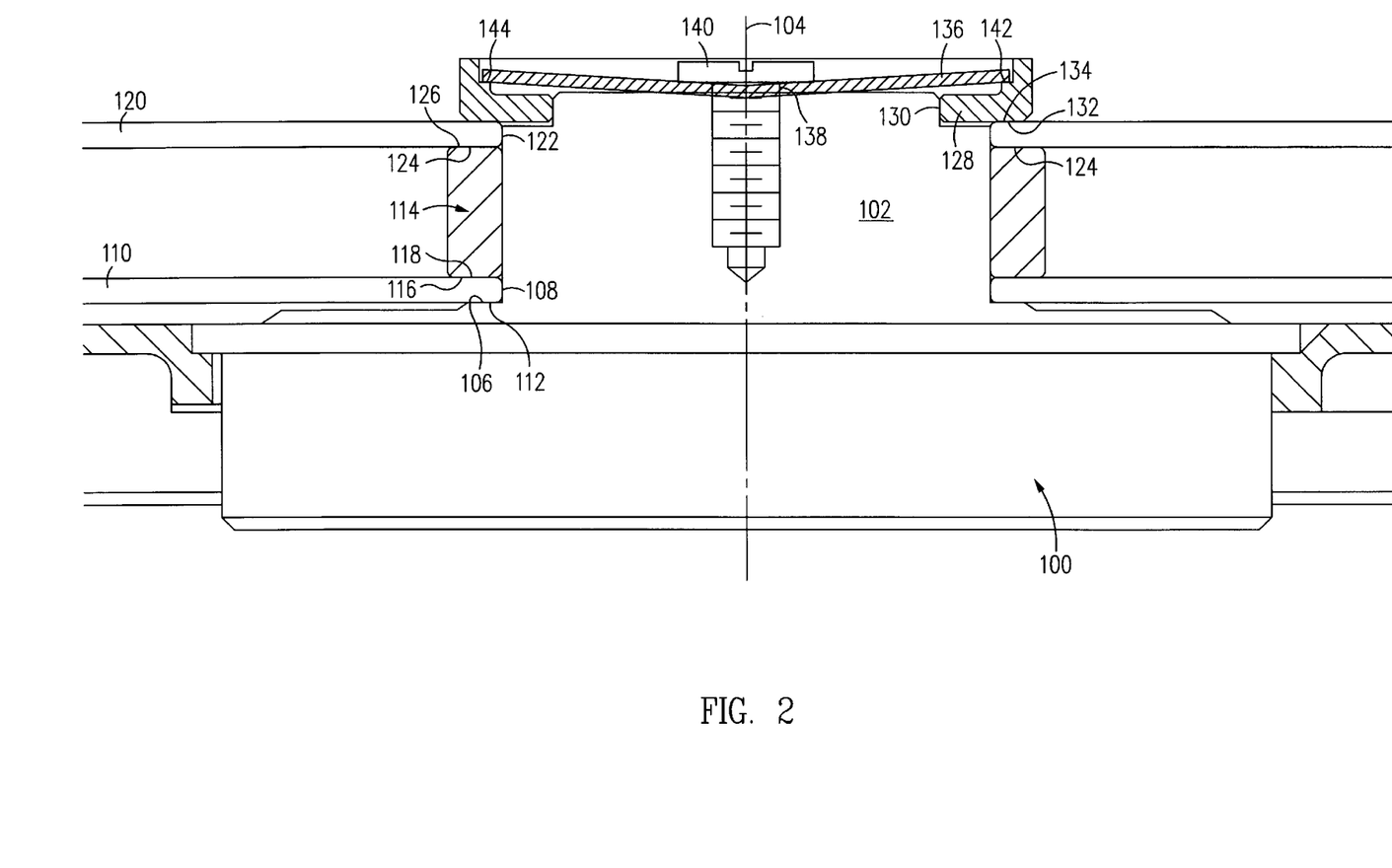
FIG. 2 is a sectional view of a first embodiment of the invention.

With reference to FIG. 2, a disk drive motor 100 includes a spindle 102 which is rotatable about rotational axis 104. The spindle 102 defines an annular surface 106 which is perpendicular to the axis of rotation 104. The spindle 102 is disposed through a central aperture 108 defined by a first disk 110. The disk 110 at its inner periphery has one side 112 thereof in engagement with the surface 106. An annular spacer 114 is positioned about the spindle 102, and has a surface 116 perpendicular to the axis of rotation 104 and in engagement with the inner periphery of the disk 110 on the opposite side 118 of the disk 110.

A second disk 120 is mounted to the spindle 102, with the spindle 102 positioned in a central aperture 122 of the disk 120. The side 124 of the disk 120, adjacent the disk inner periphery, is in contact with the surface 126 of the spacer 114, which spacer surface 126 is also generally perpendicular to the rotational axis 104 of the spindle 102.

An annular ring 128 defines a passage 130 through which a portion of the spindle 102 is positioned, the annular ring 128 defining a surface 132 for engagement with the side 134 of the disk 120 at the inner periphery of the disk 120, opposite the side 124.

A spring clamp 136 includes a central aperture 138 through which a screw 140 is positioned, which screw 140 is threadably engaged with the spindle 102, the longitudinal axis of the screw 140 being coincident with the axis of rotation 104. The circular outer edge 142 of the spring clamp 136 mates with and bears against an annular step 144 defined by the annular ring 128.

It will be seen that by tightening the screw 140 into the spindle 102, force is applied by the spring clamp 136 uniformly to the annular step 144 and thus to the annular ring 128 and against the surface 134 of the disk 120, in a direction generally parallel to the rotational axis 104 of the spindle 102, bringing the surface 124 of the disk 120 against the surface 126 of the spacer 114, in turn forcing the surface 118 of the spacer 116 against the surface 118 of the disk 110, so that the surface 112 of the disk 110 is forced against the spindle surface 106. As will be seen, no appreciable radial force (i.e., force perpendicular to the axis of rotation 104) is applied by the annular ring 128 to the disk 120.

Figure 3:
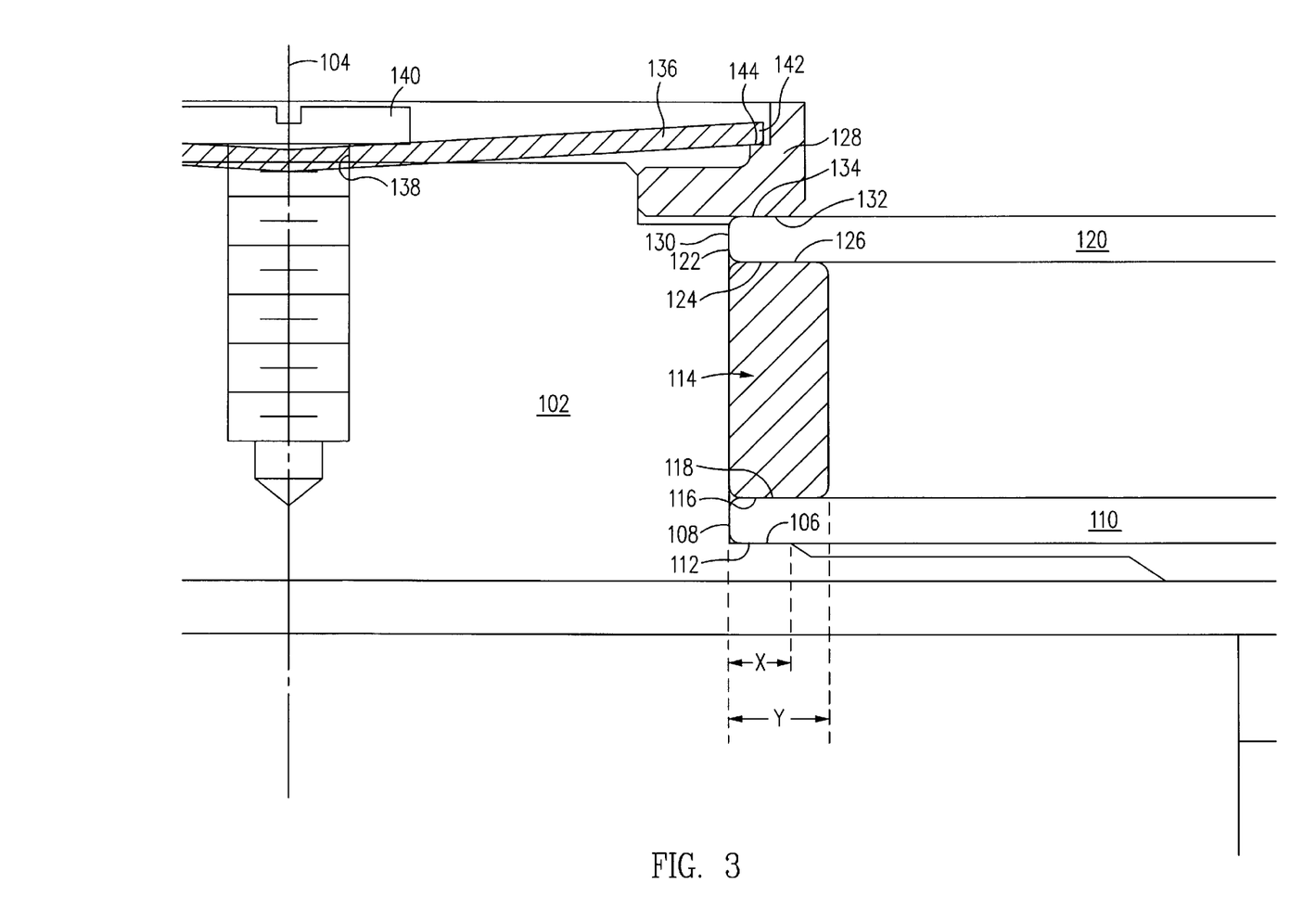
FIG. 3 is an expanded view of a portion of the structure of FIG. 2.
Figure 4:
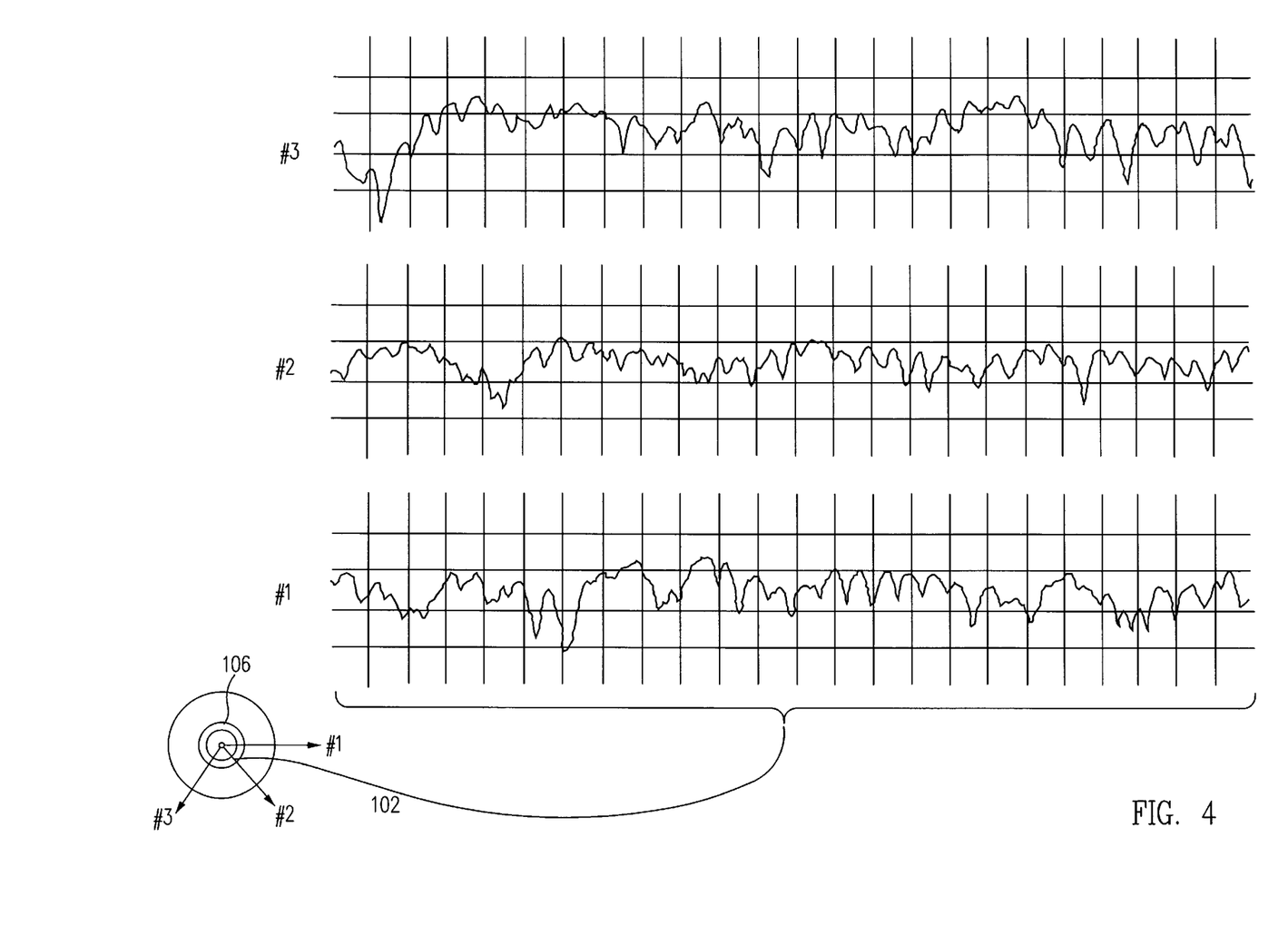
FIG. 4 includes FIGS. 4a, 4b and 4c showing typical radial traces of the spindle surface against which a disk is mounted.

Several important features of the invention are shown in more detail in FIGS. 3 and 4.

As shown in FIG. 3, the width Y of the surface 116 of the spacer 114 is greater than the width X of the surface 106 of the spindle 102, as measured in a direction generally perpendicular to the rotational axis 104 of the spindle 102. In addition, the surface 116 of the spacer 114 for contact with the disk can be made very flat, i.e., typically less than 0.1 microns, and smooth, less than 0.2 microns, through a double grinding and lapping process. On the other hand, it is not readily possible to produce a spindle surface 106 with a similar flatness and finish because such surface 106 is inaccessible for conventional grinding and lapping techniques.

Figure 5:
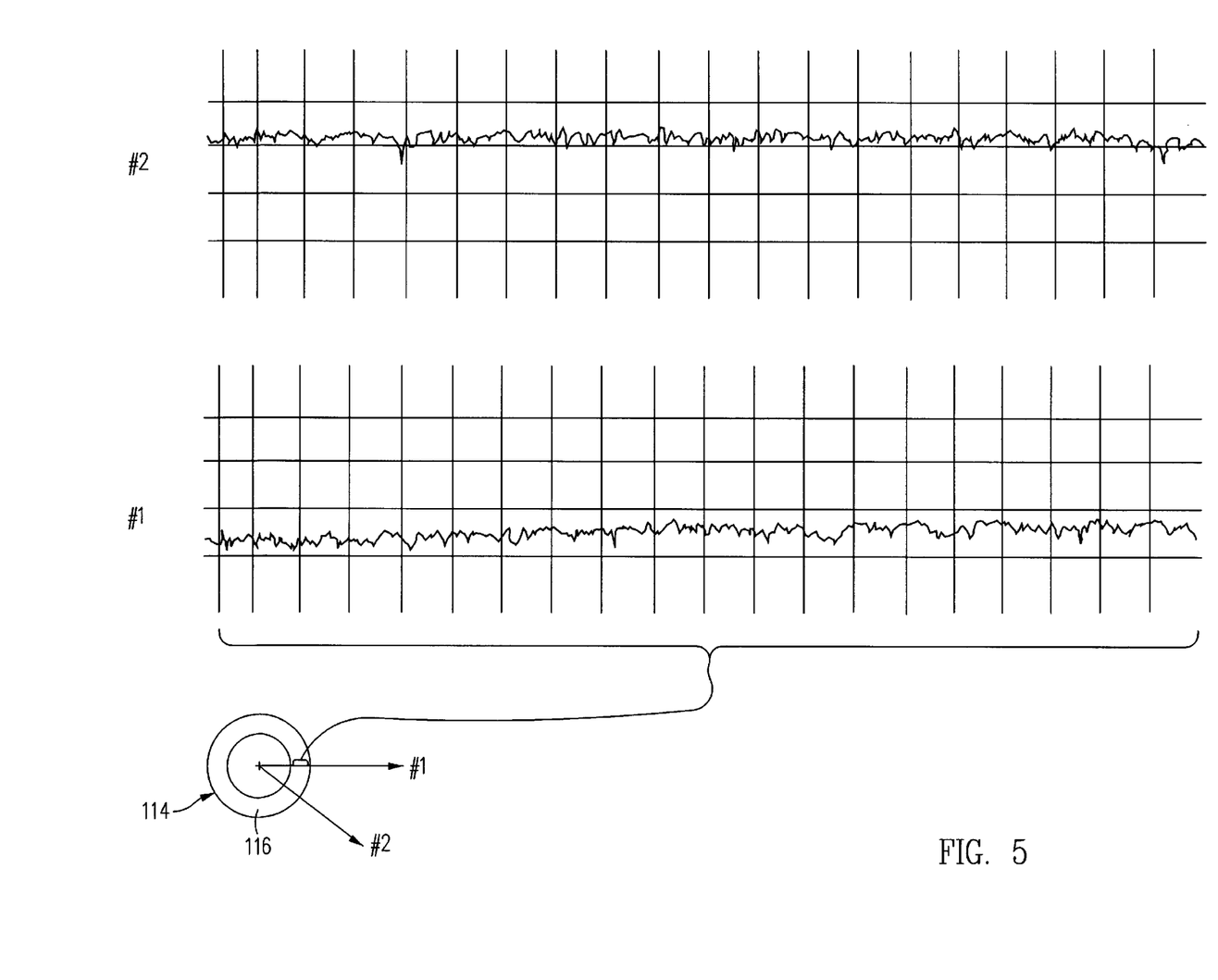
FIG. 5 includes FIGS. 5a and 5b showing radial traces of an annular spacer surface against which a disk is mounted.
Figure 6A:
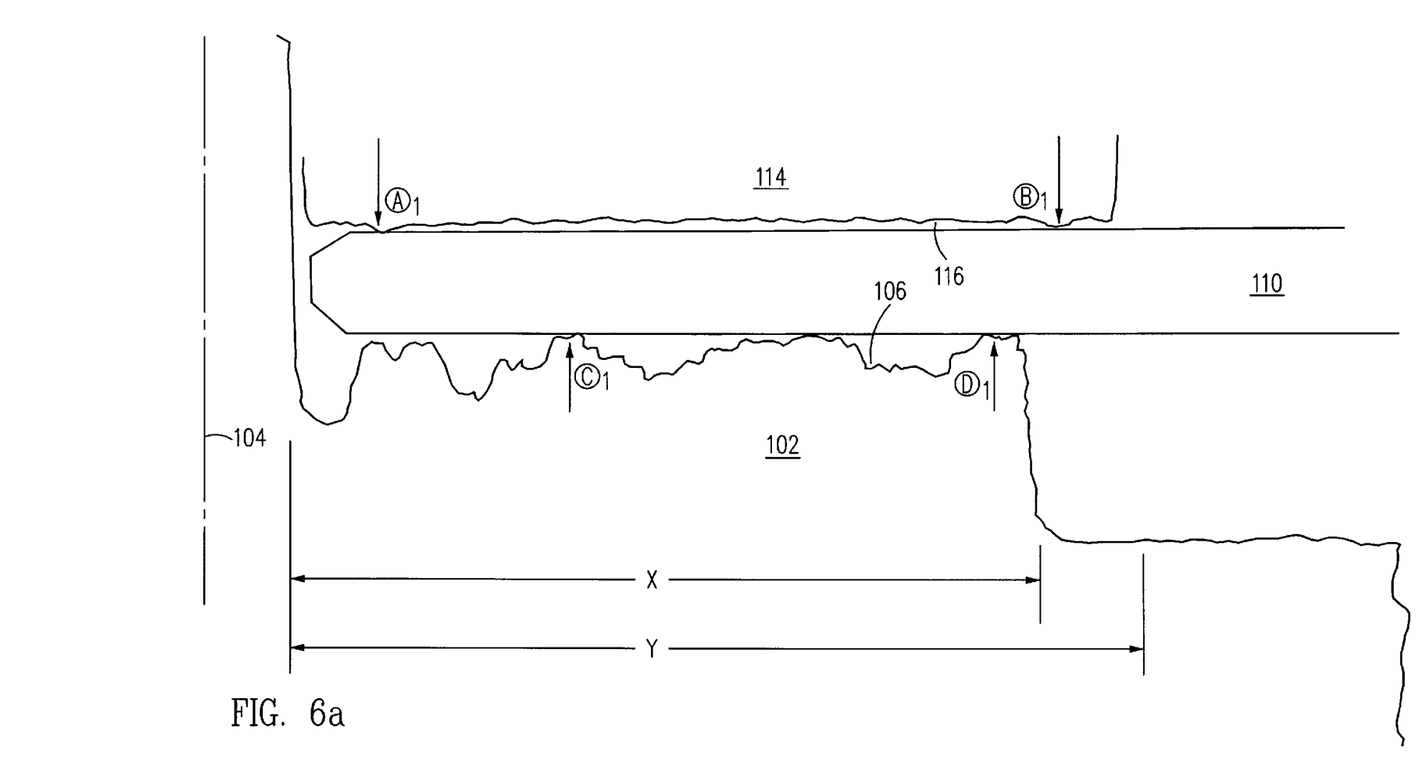
FIG. 6 is a view showing a force analysis of a portion of the structure of FIG. 3.
Figure 6B:
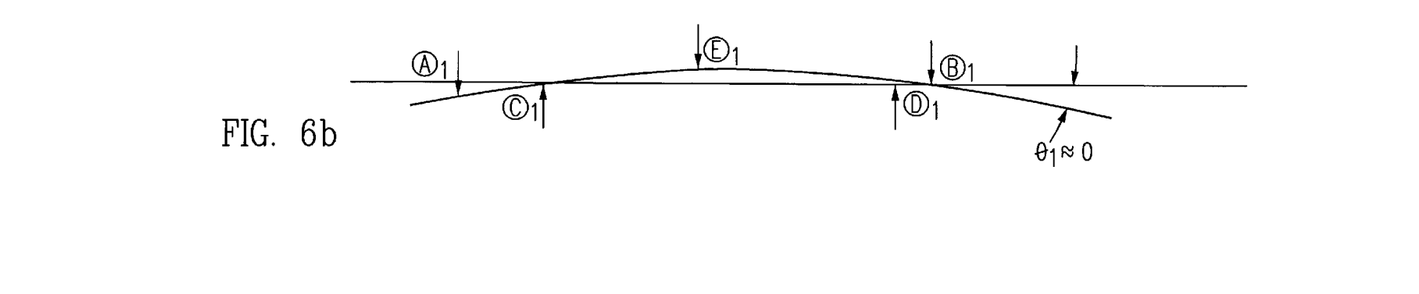

FIG. 4 shows a series of radial surface finish traces (FIGS. 4a, 4b, 4c) taken along different radii for a typical surface 106 of the spindle 102. FIG. 5 shows a series of radial traces (FIGS. 5a, 5b) of a lapped spacer ring surface 116, taken along different radii. With reference to FIG. 6a, and with the dimension X (width) less than the dimension Y (width) as measured along a line perpendicular to the rotational axis 104, and further with the surface 116 being more flat than the surface 106, we assume that the force of clamping is applied by the surface 116 of the spacer 114 at points $A_1$ and $B_1$, these being the high points of the surface 116 of the spacer 114. The resultant force is applied to the disk 110 by the surface 106 of the spindle 102 at points $C_1$ and $D_1$, these being the high points of that surface 106. For purposes of analysis, this may be treated as a simple beam as shown in FIG. 6b. The forces applied would bend the beam (disk 110) until static equilibrium is reached or until the disk 110 would contact the spacer 114 at point $E_1$. The end condition for the beam at that point would be an angle somewhere between $\theta_1$ and zero, with $\theta_1$ roughly described by a line between the points $E_1$ and $B_1$, i.e., $\theta_1$ being reached when the point $E_1$ is contacted. Since the flatness of the surface 116 of the spacer 114 is better than the flatness of the surface 106, this angle $\theta_1$ would be near zero.

Figure 7A:
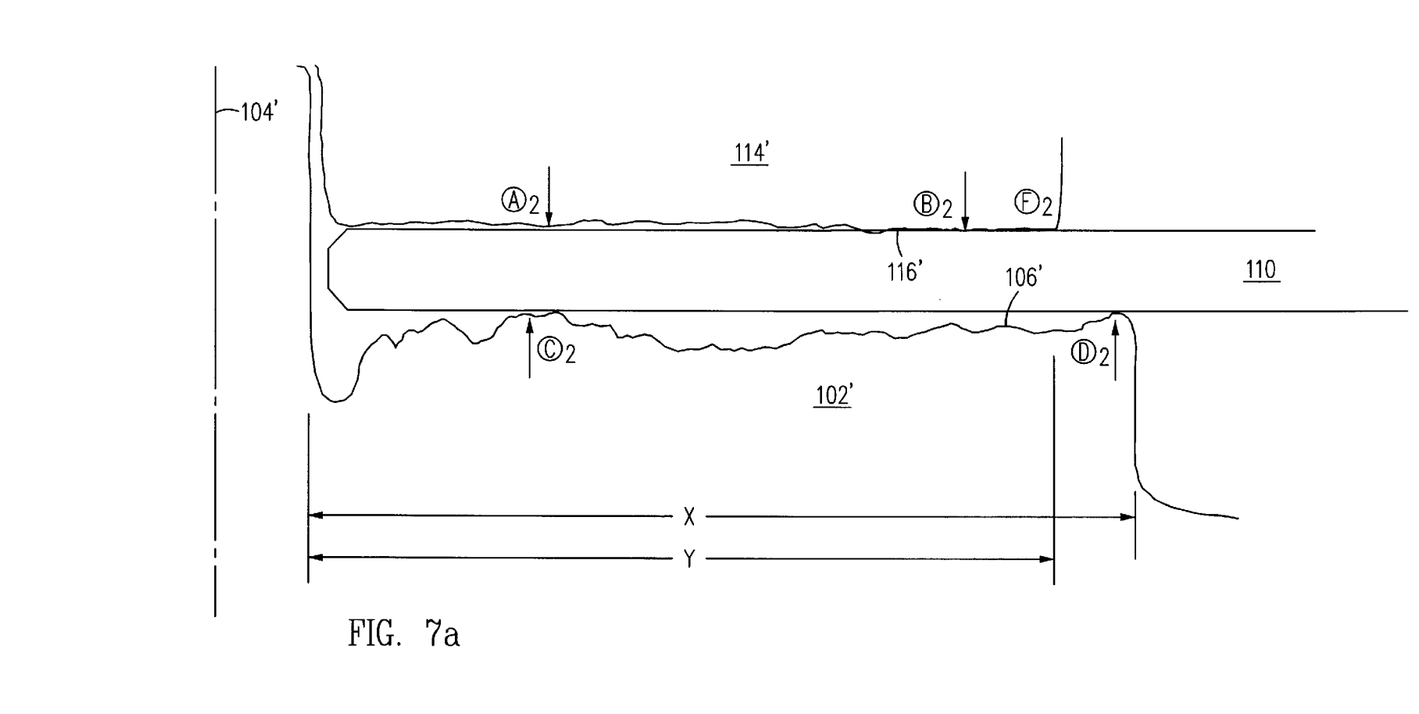
FIG. 7 is a view similar to that shown in FIG. 6 but showing certain changed dimensions.

FIG. 7a, shows the less desirable case where the dimension X (width) of the surface as $106^1$ measured along a line perpendicular to the rotational axis $104^1$ of the spindle $102^1$ is greater than the corresponding dimension Y (width) of the spacer $114^1$.

Figure 7B:
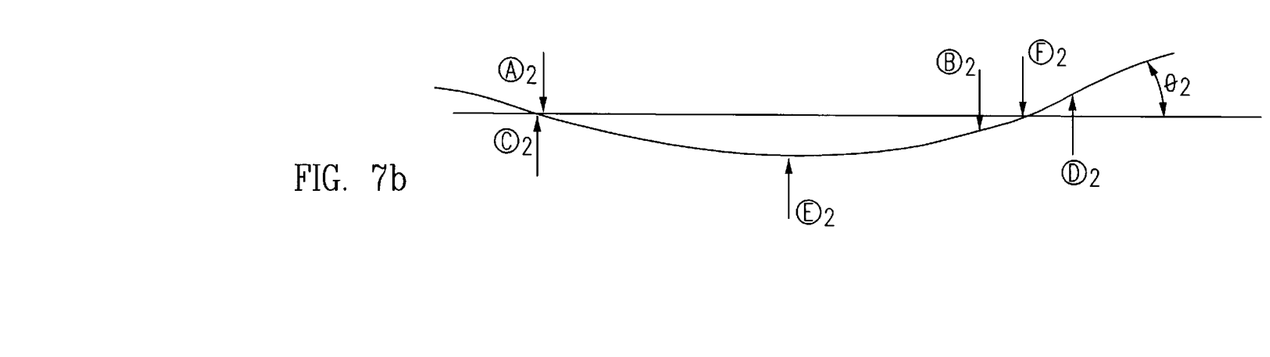

A simple beam analyses of this structure is shown in FIG. 7b. The end condition of the angle $\theta_2$ hereagain is constrained by the static forces or until the beam contacts the point $E_2$. Again, because the surface $106^1$ is less flat than the surface $116^1$, the location of the point $E_2$ is more variable on the surface $106^1$ than on the surface $116^1$ of the spacer $114^1$ so that a much greater set of variable conditions exist when this analysis is applied to the multitude of radial lines around the surface $106^1$ than in the above mentioned case of a wider surface 116 (FIGS. 6a, 6b).

It logically follows that a flatter, more uniform disk 110 surface is created from greater uniformity of clamping conditions in the situation described in FIGS. 6a, 6b. That is, the disk 110 tends to reference to the flatter, wider surface.

A like analysis applies to the surface 126 of the spacer 114 and the surface 132 of the annular ring 128 in engagement with the disk 120.

Figure 8A:
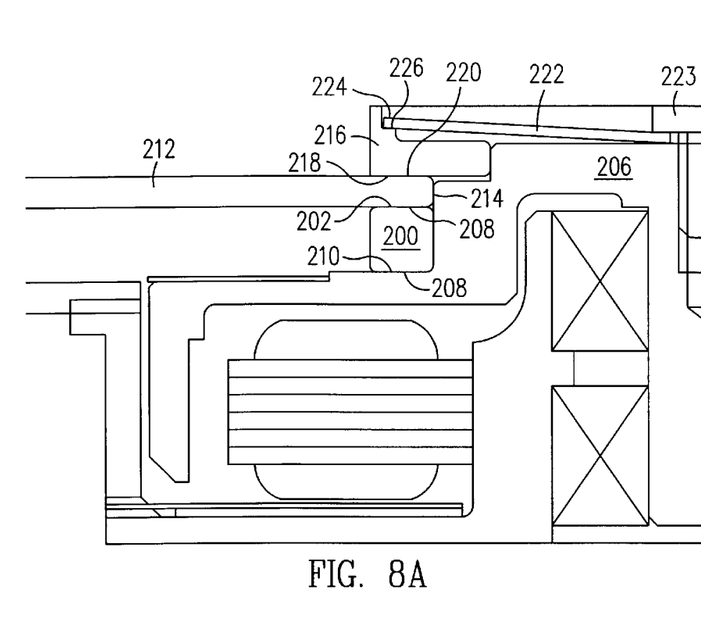
FIG. 8 includes FIGS. 8a and 8b showing sectional views of two additional embodiments of the invention.
Figure 8B:
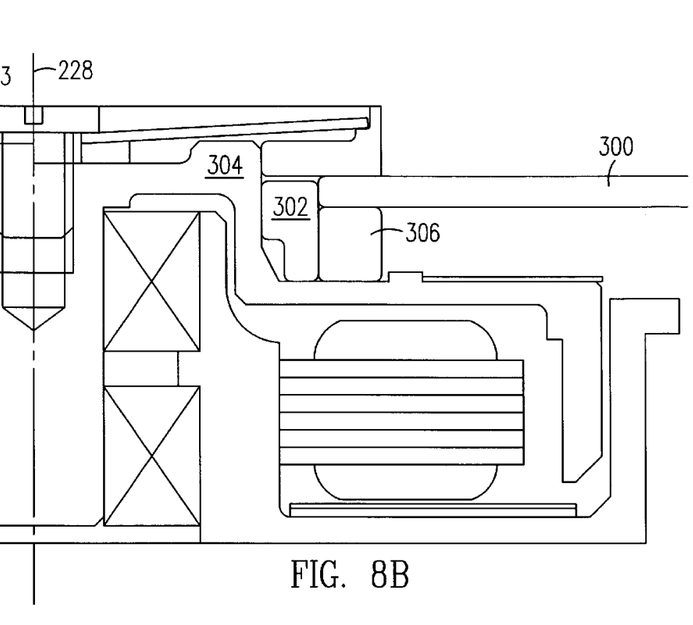

FIG. 8 shows two embodiments at FIGS. 8a and 8b for mounting a single disk. As shown therein, the apparatus described is quite similar to that shown in FIG. 2, but in this case, in FIG. 8a, a spacer 200 has a smooth surface 202 for engagement with the disk surface 204 mounted about the spindle 206, and has a surface 208 in engagement with the surface 210 of the spindle 206. A disk 212 is mounted to the spindle 206, with the spindle 206 positioned in a central aperture 214 of the disk 212. An annular member 216 is mounted to the spindle 206 and has a surface 218 in engagement with the surface 220 of the disk 212, and a spring member 222 is fixed to the spindle 206 by screw 223 previously described. The outer edge 224 of the spring member 222 presses against an annular step 226 of the ring 216 so that force is applied by the annular member 216 to the surface 220 of the disk 212 uniformly and generally parallel to the rotational axis 228 of the spindle 206. In addition, the width of the annular ring 216 as measured along a direction perpendicular to the rotational axis 228 is less than the width of the surface 202 of the spacer 200 as measured in that direction, and the surface 202 of the spacer 200 is more flat than the surface 218. Thus, the features and analyses described above apply with equal force here.

With reference to FIG. 8b, this apparatus is similar to that shown in FIG. 8a, but includes a disk 300 mounted to a hub 302 which is in turn mounted on the spindle 304. In this case, the spacer 306 surrounds the hub 302 for engagement with the disk 300.

Because of the structure disclosed it will be seen that no radial force is applied to the disks as is the case with the previously described prior art. In addition, by fabricating the spring clamp and annular member from similar hardness steels, galling and contamination may be greatly reduced.

Referring now to FIGS. 2 and 3, the spring clamp as at 136 is very easy and inexpensive to fabricate because it is essentially a flat stamped configuration. The spring clamp acts very much like an ideal spring.

The force of clamping can easily be varied by adding more spring clamps or changing the thickness of the single spring clamp. Furthermore, the spring material can be made from a high strength material (not being a formed structure) which allows for accurate axial force control.

Figure 9:
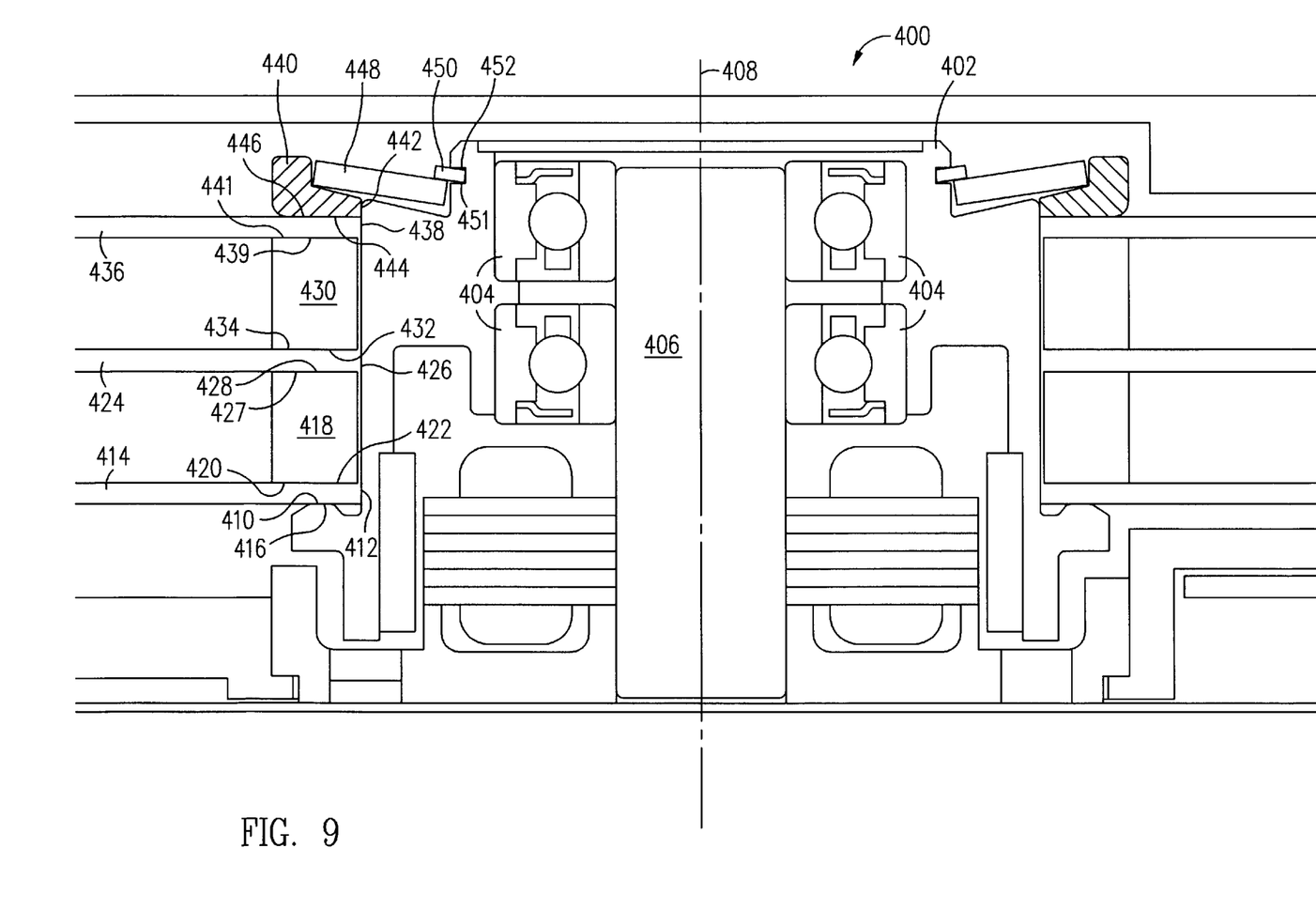
FIG. 9 is a sectional view of an additional embodiment of the invention.
Figure 10:
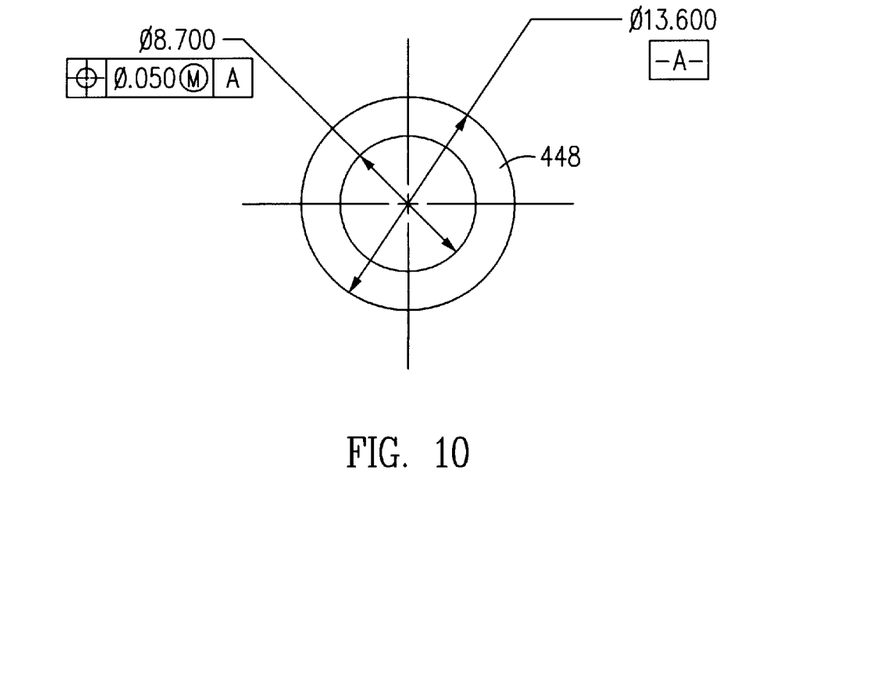
FIG. 10 is a plan view of the spring member of the embodiment of FIG. 9.
Figure 11:
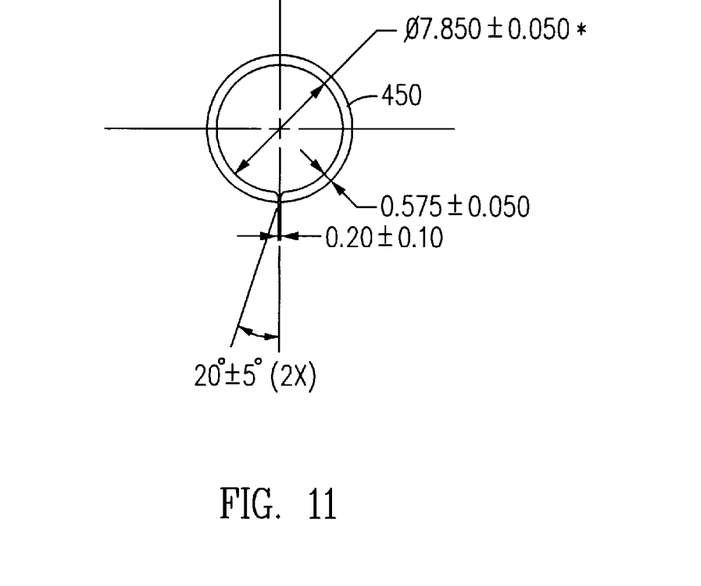
FIG. 11 is a plan view of the retaining member of the embodiment of FIG. 9.

Another embodiment of the invention is shown in FIGS. 9–11.

With reference to FIG. 9, a disk drive assembly 400 includes a spindle 402 which is mounted by ball bearings 404 to a shaft 406 so as to be rotatable about the axis 408 of the shaft 406. The spindle 402 defines an annular surface 410 which is perpendicular to the axis of rotation 408, the spindle 402 being disposed through a central aperture 412 defined by a first disk 414. The disk 414 at its inner periphery has one side 416 thereof in engagement with the surface 410. An annual spacer 418 is positioned about the spindle 402, and has a surface 420 perpendicular to the axis of rotation 408 and in engagement with the inner periphery of the disk 414 on the opposite side 422 of the disk 414.

A second disk 424 is mounted to the spindle 402, with the spindle 402 positioned in a central aperture 426 of the disk 424. The side 427 of the disk 426, adjacent the disk inner periphery, is in contact with the surface 428 of the spacer 418, which spacer surface 428 is also generally perpendicular to the rotational axis 408 of the spindle 402. A second annular spacer 430 is positioned about the spindle 402, having a surface 432 perpendicular to the axis of rotation 408 and in engagement with the inner periphery of the disk 424 on the opposite side 434 of the disk 424. A third disk 436 is mounted to the spindle 402, with the spindle 402 positioned in a central aperture 438 of the disk 436. The side 439 of the disk 436, adjacent the inner periphery of the disk 436, is in engagement with the surface 441 of the spacer 430, which surface 441 is perpendicular to the axis of rotation 408.

An annular ring 440 defines a passage 442 in which a portion of the spindle 402 is positioned, the annular ring 440 defining a surface 444 for engagement with the side 446 of the disk 436 at the inner periphery of the disk 436, opposite the side 439.

An annular spring member 448 (FIGS. 9 and 10) is disposed about the spindle 402, and a single retaining member 450 in the form of a split ring resilient spring member (FIGS. 9 and 11) is disposed about the spindle 402 and is seated in an annular channel 452 formed about the spindle 402. This single retaining member 450 surrounds the spindle 402 and, when so positioned, applies force to the spring member 448 so that the spring member 448 in turn applies force to the annular ring 440 to force the annular ring 440 against the side 446 of a disk 436. It will be seen that this force is applied uniformly to the annular ring 440 and thus to the side 446 of the disk 436 in a direction parallel to the rotational axis 408 of the spindle 402, bringing the disks 414, 424, 436 and annular spacers 418, 430 together against the surface 410.

As will be seen, no appreciable radial force (i.e., force perpendicular to the axis of rotation 408) is applied by the annular ring 440 to the disk 436.

In the ball bearing type design shown in FIG. 9, the clamping structure thus described allows the ball bearings 404 to be positioned as closely as possible to the top of the overall assembly, allowing increased space for motor windings and allowing use of large size bearings, capable of withstanding relatively great shock.

As noted in FIG. 10, the spring member 448 in its free state is a flat disk, which can be produced by etching in order to eliminate burring, contamination and flatness issues which may arise if such part were to be produced by stamping.

It has been found that a clamping force on the order of 40 to 50 pounds has proven efficient, with installed deflection of the spring member 448 in the range of 0.35 to 0.45 millimeters.

The free shape of the retaining member 450 (FIG. 11) is chosen such that the inner diameter of the retaining member 450 will conform closely to the inner surface 451 of the channel 452 when installed. The retaining member 450 is fabricated by etching for tighter tolerance control than could be achieved with stamping.

The reaction load of the spring member 448 at 454 is applied to the spindle 402 at a large radius around the spindle, as compared to the design of FIG. 2, so that bending distortion of the spindle 402 is minimized.

The retaining member 450 is installed with the spring member 448 held in its deformed position by an assembly tool (not shown). The spindle 402 is supported by pins which are part of the assembly tool to prevent damage to the bearings 404 during the installation of member 450. Compared to the screw fastening described previously, particle contamination produced during retaining member installation is reduced since metal to metal sliding action is minimized.

Figure 12:
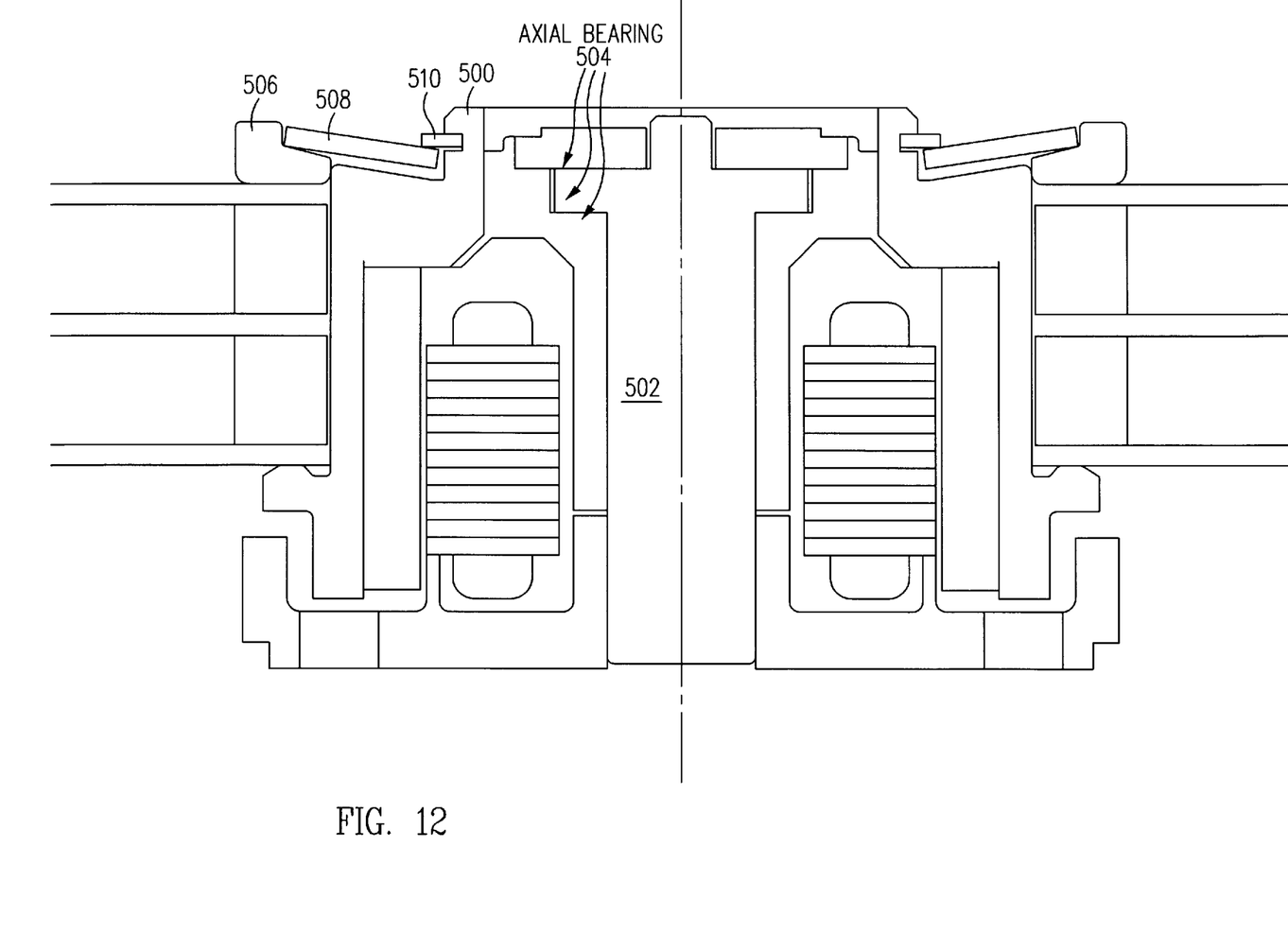
FIG. 12 is a sectional view of yet another embodiment of the invention.

FIG. 12 shows yet another embodiment of the invention.

FIG. 12 shows a system similar to that shown in FIG. 9, but with the spindle 500 being rotatably mounted to a fixed shaft 502 by means of axial fluid bearings as indicated at 504. This embodiment includes the annular ring 506, spring member 508 and retaining member 510 all as disclosed in FIG. 9.

In this embodiment, it will be noted that the axial bearings 504 are packaged in an area allowing maximization of available motor winding space.

The use of a single retaining member (in the form of a screw 140, 223 threadably attached to the spindle with its longitudinal axis along the rotational axis of the spindle, as described above with reference to FIGS. 2 and 8, or the single retaining member 450, 510 of FIGS. 9 and 12), assures a simple yet effective means for retaining disks on a spindle without application of radial force being applied to the disks. Each embodiment is of very compact and low-profile design, yet is highly effective in its intended function.

We claim:

1. A disk drive apparatus comprising:
   a drive motor with a spindle rotatable around an axis of rotation, said spindle having:
   a first circumferential surface parallel to the axis of rotation wherein said first circumferential surface is defined by a first diameter;
   a second circumferential surface parallel to the axis of rotation wherein said second circumferential surface is defined by a second diameter and said second diameter is less than said first diameter; and
   an annular surface perpendicular to the axis of rotation and extending from said first circumferential surface to said second circumferential surface;
   an annular spacer having:
   first and second annular surfaces perpendicular to the axis of rotation;
   an inner edge surface extending from said first annular surface to said second annular surface wherein the inner edge surface of the annular spacer is in engagement with the first circumferential surface of the spindle;
   a disk having:
   an aperture through which the spindle is disposed;
   a first side in engagement with one annular surface of the annular spacer; and
   a second side opposite to and separated from said first side;

an annular ring having:
a first annular surface in contact with said second side of said disk;
a second annular surface opposite to and separated from said first annular surface,
an inner circumferential surface in contact with one of said first circumferential surface of said spindle and said second circumferential surface of said spindle; and
an annular step;
a flat annular spring clamp having:
two opposing planar surfaces;
an outer circumferential surface extending between said two opposing planar surfaces; and
an inner circumferential surface extending between said two opposing planar surfaces;
wherein a first of said two opposing planar surfaces contacts said annular step of said annular ring at a point located over said disk without contacting said second annular surface of said annular ring; and
a retaining member engaging a second of said two opposing planar surfaces of said flat annular spring clamp about said inner circumferential surface of said flat annular spring clamp, and engaging said spindle so that said flat annular spring clamp applies a force to the annular ring in a direction generally parallel to the axis of rotation.

2. The apparatus of claim 1 wherein the retaining member is a screw threadably attached to the spindle with a longitudinal axis of the screw coinciding with the rotational axis of the spindle.

3. The apparatus of claim 2 wherein the flat annular spring clamp is a hardened spring steel annular clamp.

4. The apparatus of claim 3 wherein the flat annular spring clamp has a selectable spring constant.

5. The apparatus of claim 4 wherein the spring constant is selected so that the force applied to the annular ring is between 40 and 50 pounds.

6. The apparatus of claim 5 wherein the spring constant is selected by selecting a different thickness spring steel.

7. The apparatus of claim 5 wherein the spring constant is selected by adding at least one additional flat annular spring clamp.

8. The apparatus of claim 5 further comprising an annular hub interposed between the spindle and the disk and the annular spacer.

9. The apparatus of claim 1 wherein the retaining member is a ring member disposed in an annular channel formed about the spindle.

10. The apparatus of claim 9 wherein the ring member is an annular split ring resilient member.

11. The apparatus of claim 10 wherein the flat annular spring clamp is a hardened spring steel annular clamp.

12. The apparatus of claim 11 wherein the flat annular spring clamp has a selectable spring constant.

13. The apparatus of claim 12 wherein the spring constant is selected so that the force applied to the annular ring is between 40 and 50 pounds.

14. The apparatus of claim 13 wherein the spring constant is selected by selecting a different thickness spring steel.

15. The apparatus of claim 13 wherein the spring constant is selected by adding at least one additional flat annular spring clamp.

16. The apparatus of claim 13 further comprising an annular hub interposed between the spindle and the disk and the annular spacer.

17. A disk drive apparatus comprising:
a drive motor with a spindle rotatable around an axis of rotation, said spindle having:
a first annular surface perpendicular to the axis of rotation;
a first circumferential surface parallel to the axis of rotation wherein said first circumferential surface is defined by a first diameter;
a second circumferential surface parallel to the axis of rotation wherein said second circumferential surface is defined by a second diameter and said second diameter is less than said first diameter; and
a second annular surface perpendicular to the axis of rotation and extending from said first circumferential surface to said second circumferential surface;
a first disk having: an aperture through which the spindle is disposed; a first side in engagement with the first annular surface of the spindle; and a second side;
a first annular spacer having: an aperture through which the spindle is disposed; and first and second annular surfaces perpendicular to the axis of rotation, wherein the first annular surface of said first annular spacer is in engagement with said second side of said first disk;
a second disk having: an aperture through which the spindle is disposed; a first side in engagement with the second annular surface of the first annular spacer; and a second side;
an annular ring having:
a first annular surface in contact with said second side of said second disk;
a second annular surface opposite and separate from said first annular surface;
an inner circumferential surface in contact with one of said first circumferential surface of said spindle and said second circumferential surface of said spindle; and
an annular step;
a flat annular spring clamp having:
two opposing planar surfaces;
an outer circumference surface extending between said two opposing planar surfaces; and
an inner circumferential surface extending between said two opposing planar surfaces;
wherein a first of said two opposing planar surfaces contacts said annular step of said annular ring at a point located over said disk without contacting said second annular surface of said annular ring; and
a retaining member engaging a second of said two opposing planar surfaces of said flat annular spring clamp about said inner circumferential surface of said flat annular spring clamp, and engaging said spindle so that said flat annular spring clamp applies a force to the annular ring in a direction generally parallel to the axis of rotation.

18. The apparatus of claim 17 wherein:
the first annular surface of said spindle has a radial width X;
the first and second annular surfaces of said first annular spacer have a radial width Y;
a radial dimension of the annular ring is selected so that the annular ring overlaps the second side of the second disk by the radial width X; and
wherein the widths X and Y are selectively chosen to maintain flatness of said disks.

19. The apparatus of claim 18 wherein the width Y is chosen to be greater than width X.

20. The apparatus of claim 19 further comprising at least one additional annular spacer having an aperture through which the spindle is disposed and first and second annular surfaces perpendicular to the axis of rotation with radial widths Y and at least one additional disk having an aperture through which the spindle is disposed wherein said at least one additional annular spacer and said at least one additional disk are interposed on said spindle between the second disk and the annular ring.

21. The apparatus of claim 18 wherein the annular surfaces with radial width Y are flatter than the annular surfaces with radial width X.

22. The apparatus of claim 17 wherein the retaining member is a screw threadably attached to the spindle with a longitudinal axis of the screw coinciding with the rotational axis of the spindle.

23. The apparatus of claim 22 wherein the flat annular spring clamp is a hardened spring steel annular clamp.

24. The apparatus of claim 23 wherein the flat annular spring clamp has a selectable spring constant.

25. The apparatus of claim 24 wherein the spring constant is selected so that the force applied to the annular ring is between 40 and 50 pounds.

26. The apparatus of claim 25 wherein the spring constant is selected by selecting a different thickness spring steel.

27. The apparatus of claim 25 wherein the spring constant is selected by adding at least one additional flat annular spring clamp.

28. The apparatus of claim 17 wherein the retaining member is a ring member disposed in an annular channel formed about the spindle.

29. The apparatus of claim 28 wherein the ring member is an annular split ring resilient member.

30. The apparatus of claim 29 wherein the flat annular spring clamp is a hardened spring steel flat annular clamp.

31. The apparatus of claim 30 wherein the flat annular spring clamp has a selectable spring constant.

32. The apparatus of claim 31 wherein the spring constant is selected so that the force applied to the annular ring is between 40 and 50 pounds.

33. The apparatus of claim 32 wherein the spring constant is selected by selecting a different thickness spring steel.

34. The apparatus of claim 32 wherein the spring constant can be selected by adding at least one additional flat annular spring clamp.

35. The apparatus of claim 32 further comprising an additional annular spacer having an aperture through which the spindle is disposed, wherein the additional spacer has radial width Y and is disposed between the first annular surface of the spindle and the first disk.

36. The apparatus of claim 32 further comprising an annular hub interposed between the spindle and the disks and annular spacers.

* * * * *